(12) United States Patent
Schumann et al.

(10) Patent No.: US 10,804,752 B2
(45) Date of Patent: Oct. 13, 2020

(54) TRANSMISSION SYSTEM FOR CONTACTLESSLY TRANSMITTING ENERGY

(71) Applicant: Robert Bosch GmbH, Stuttgart (DE)

(72) Inventors: Philipp Schumann, Stuttgart (DE); Bernhard Mader, Kernen (DE); Oliver Blum, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/308,013

(22) PCT Filed: May 17, 2017

(86) PCT No.: PCT/EP2017/061841
§ 371 (c)(1),
(2) Date: Dec. 7, 2018

(87) PCT Pub. No.: WO2017/211557
PCT Pub. Date: Dec. 14, 2017

(65) Prior Publication Data
US 2019/0260234 A1      Aug. 22, 2019

(30) Foreign Application Priority Data

Jun. 7, 2016    (DE) .................. 10 2016 210 018

(51) Int. Cl.
*H02J 50/80*   (2016.01)
*H02J 50/12*   (2016.01)
(Continued)

(52) U.S. Cl.
CPC .............. *H02J 50/80* (2016.02); *B60K 6/22* (2013.01); *B60L 53/122* (2019.02);
(Continued)

(58) Field of Classification Search
CPC . H02J 50/12; H02J 50/80; H02J 7/025; B60L 53/305; B60L 53/665; B60L 53/12;
(Continued)

(56) References Cited

U.S. PATENT DOCUMENTS

2011/0115303 A1*   5/2011   Baarman .............. H02J 5/005
                                                   307/104
2012/0306285 A1   12/2012   Kim et al.
(Continued)

FOREIGN PATENT DOCUMENTS

DE    102008044662    3/2010
DE    102011077709    12/2012
(Continued)

OTHER PUBLICATIONS

International Search Report for Application No. PCT/EP2017/061841 dated Aug. 18, 2017 (English Translation, 3 pages).

*Primary Examiner* — Jared Fureman
*Assistant Examiner* — Michael J Warmflash
(74) *Attorney, Agent, or Firm* — Michael Best & Friedrich LLP

(57) ABSTRACT

Method for contactlessly transmitting electrical energy to a load (17) using a transmission system (1), having the steps of: converting alternating current from an alternating current source (4) into direct current using a primary rectifier (5), converting the direct current generated by the primary rectifier (5) into alternating current using a primary inverter (7), changing a primary parameter (di) at a component (38) of a primary part (2) of the transmission system, such that the electrical power consumed by a load (17) is changed as a result, contactlessly transmitting the electrical energy of the alternating current generated by the primary inverter (7) from a primary coil (9) to a secondary coil (12), converting the alternating current generated in the secondary coil (12) into direct current using a secondary rectifier (15), changing (Continued)

a secondary parameter at a component (16) of a secondary part (3) of the transmission system (1), such that the electrical power consumed by the load (17) is changed as a result, supplying electrical energy as direct current to the load (17), wherein an A-efficiency of the contactless transmission of energy with respect to a secondary A-parameter is determined, the secondary parameter is then changed from the secondary A-parameter to at least one secondary B-parameter and a B-efficiency is determined for the at least one secondary B-parameter, and that efficiency with the maximum efficiency is selected from the A-efficiency and from the at least one B-efficiency and this selected maximum efficiency is referred to as C-efficiency, and energy is then contactlessly transmitted with a secondary C-parameter assigned to the C-efficiency as an iteration step for determining the secondary C-parameter.

18 Claims, 3 Drawing Sheets

(51) Int. Cl.
| | |
|---|---|
| *B60K 6/22* | (2007.10) |
| *H02J 7/02* | (2016.01) |
| *H02M 1/08* | (2006.01) |
| *B60L 53/122* | (2019.01) |
| *B60L 53/30* | (2019.01) |
| *H02M 7/12* | (2006.01) |
| *H02M 3/155* | (2006.01) |
| *H02M 7/48* | (2007.01) |
| *H02M 3/335* | (2006.01) |
| *B60L 53/66* | (2019.01) |
| *H02M 7/06* | (2006.01) |
| *H02M 1/00* | (2006.01) |

(52) U.S. Cl.
CPC ......... *B60L 53/305* (2019.02); *B60L 53/665* (2019.02); *H02J 7/025* (2013.01); *H02J 50/12* (2016.02); *H02M 1/083* (2013.01); *H02M 3/155* (2013.01); *H02M 3/335* (2013.01); *H02M 7/12* (2013.01); *H02M 7/4826* (2013.01); *B60Y 2200/91* (2013.01); *B60Y 2200/92* (2013.01); *B60Y 2300/91* (2013.01); *H02M 7/06* (2013.01); *H02M 2001/007* (2013.01); *H02M 2001/0048* (2013.01); *H02M 2001/0058* (2013.01); *Y02T 10/7005* (2013.01); *Y02T 10/7088* (2013.01); *Y02T 10/92* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ......... B60K 6/22; Y02T 10/92; Y02T 90/163; Y02T 90/122; Y02T 10/7005; Y02T 90/128; Y02T 90/14; Y02T 10/7088; Y02T 90/127; Y02T 90/169; Y02T 90/121; Y02T 10/7022; Y04S 30/14; H02M 2001/0048; H02M 7/06; H02M 2001/0058; H02M 2001/007; H02M 7/12; H02M 3/155; H02M 7/4826; H02M 3/335; H02M 1/083; B60Y 2200/91; B60Y 2200/92; B60Y 2300/91
See application file for complete search history.

(56) References Cited

U.S. PATENT DOCUMENTS

| | | |
|---|---|---|
| 2013/0293026 A1 | 11/2013 | Miyamoto et al. |
| 2015/0042173 A1 | 2/2015 | Lee et al. |
| 2015/0054456 A1* | 2/2015 | Yamakawa ......... H02M 7/5387 320/108 |
| 2015/0357991 A1* | 12/2015 | Ono ................ H01F 38/14 320/108 |
| 2017/0047768 A1* | 2/2017 | Diekhans ............ H02J 7/00302 |
| 2017/0355270 A1* | 12/2017 | Elshaer .................. H02J 7/022 |

FOREIGN PATENT DOCUMENTS

| | | |
|---|---|---|
| DE | 112013006208 | 9/2015 |
| DE | 102014207854 | 10/2015 |
| DE | 102014222475 | 5/2016 |
| EP | 2143195 | 1/2010 |
| EP | 2623363 | 8/2013 |
| EP | 2824797 | 1/2015 |
| EP | 2899847 | 7/2015 |
| EP | 2928038 | 10/2015 |

* cited by examiner

TRANSMISSION SYSTEM FOR CONTACTLESSLY TRANSMITTING ENERGY

BACKGROUND OF THE INVENTION

The present invention relates to a transmission system for contactlessly transmitting energy to a consumer, a method for contactlessly transmitting energy to a consumer, and a vehicle arrangement.

Electrical energy storage devices are used in a plurality of applications. For example, batteries are used as energy storage devices in particular in mobile applications. For example, batteries are used in electric vehicles or hybrid vehicles as energy storage devices in order to provide energy for the electric drive motor of the electric vehicle or hybrid vehicle. In order to be able to use a battery as an energy storage device in a vehicle, a way must also be provided to charge the battery.

It is customary to charge high-voltage batteries in a vehicle, for example, via a galvanic connection to the public power grid. For this purpose, a charging adapter may be installed, for example, in a garage of a house, to which the respective vehicle may be connected via a cable. Alternatively, the charging adapter is located on the vehicle side, and may be connected to a conventional outlet.

EP 26 23 363 discloses a conventional charging means for energy storage devices.

Furthermore, today, inductive charging arrangements are known in the form of transmission systems in which energy from the charging adapter is transmitted to the vehicle wirelessly via an inductive coupling of two coils.

DE 10 2014 207 854 discloses a transmission system for contactlessly transmitting energy.

In the case of so-called inductive charging of electric vehicles, the energy required for charging the vehicle battery is not transmitted to the vehicle via a charging cable (conductive charging); rather, it is transmitted contactlessly via a transformer having a large air gap. In this case, the primary coil of the transformer is typically either embedded in the ground or formed as a charging plate placed on the ground, and is connected to the power grid via a suitable electronic system. The secondary coil of the transformer is typically fixedly installed in the subfloor of the vehicle and is, for its part, connected to the vehicle battery by means of a suitable electronic system. For transmitting energy, the primary coil generates a high-frequency magnetic alternating field which penetrates the secondary coil and induces a corresponding alternating current there. A primary rectifier, a primary power correction filter, a primary impedance transformer, a primary inverter, and a primary oscillating circuit, together with the primary coil, form a primary portion of the transmission system. A secondary oscillating circuit comprising a secondary coil, a secondary rectifier, a secondary impedance transformer, and a consumer in the form of the battery to be charged, form a secondary portion of the transmission system. The voltage at the input of the primary impedance transformer is equal to the product of a variable primary transformation factor and the voltage at the output of the primary impedance transformer. The electrical power consumed by the consumer is regulated by modifying a primary parameter of a component of the primary portion; for example, at the primary impedance transformer, the primary transformation factor is modified as a primary parameter, and the primary impedance transformer is a component of the first portion of the transmission system. In deviation therefrom, the control signals of the pulse pattern modulation of the primary inverter may also be modified as a primary parameter. Disadvantageously, no optimization of the transmission system takes place in order to maintain maximum efficiency.

SUMMARY OF THE INVENTION

A transmission system according to the present invention for the contactless transmission of electrical energy to a consumer, comprising a primary rectifier for converting alternating current from an alternating current source into direct current, a primary inverter for generating alternating current from the direct current generated by the primary rectifier, a transmission means for contactlessly transmitting electrical energy of the alternating current from the primary inverter via a primary coil and a secondary coil, a secondary rectifier for converting alternating current from the secondary coil into direct current, wherein the primary rectifier, the primary inverter, and the primary coil form a primary portion of the transmission system, and the secondary coil and the secondary rectifier form a secondary portion of the transmission system, preferably a consumer, a control and/or regulating unit for controlling and/or regulating the transmission system, wherein a method described in this patent application is able to be carried out via the transmission system. The efficiency of the transmission system may thus be easily maximized, even when using a primary portion and a secondary portion from different manufacturers.

In an additional embodiment, the transmission system comprises a primary power detection means for detecting the primary electrical power at the primary portion, in particular at the input of the primary rectifier.

In an additional variant, the transmission system comprises a secondary power detection means for detecting the secondary electrical power at the secondary portion, in particular at the input of the consumer.

In an additional embodiment, the efficiency of the transmission system is ascertainable via the control and/or regulating unit, by dividing the secondary electrical power by the primary electrical power. The instantaneous efficiency is necessary for ascertaining a secondary parameter having a higher efficiency.

In a supplemental embodiment, the transmission system comprises a primary impedance transformer which is electrically connected to the primary rectifier, for modifying the voltage at the output of the primary impedance transformer as a component of the primary portion of the transmission system, and/or the transmission system comprises a secondary impedance transformer which is electrically connected to the secondary rectifier, for modifying the voltage at the output of the secondary impedance transformer as a component of the secondary portion of the transmission system, and/or the control and/or regulating unit is integrated into the secondary portion of the transmission system, and/or the transmission system comprises a means for the preferably wireless transmission of data, in particular data with respect to the primary electrical power at the primary portion, from the primary portion to the secondary portion of the transmission system, and preferably vice-versa. By modifying the primary transformation factor of the primary impedance transformer as a component of the primary portion, the primary parameter may be modified. By modifying the secondary transformation factor of the secondary impedance transformer as a component of the secondary portion, the secondary parameter may be modified. The data for the primary power which are detected by the primary power detection means may be transmitted, or rather are transmittable, from the device, preferably wirelessly, to the control and/or regulating unit in the second portion, i.e., at the motor vehicle.

In a supplementary embodiment, a method described in this patent application may be carried out via the transmission system, in particular via software in the control and/or regulating unit, and/or at least one primary capacitor is associated with the primary coil, so that the primary coil and the at least one primary capacitor form a primary oscillating electrical circuit, and/or at least one secondary capacitor is associated with the secondary coil, so that the secondary coil and the at least one secondary capacitor form a secondary oscillating electrical circuit.

Method according to the present invention for contactlessly transmitting electrical energy to a consumer via a transmission system, comprising the steps of: converting alternating current from an alternating current source into direct current via a primary rectifier; converting the direct current generated by the primary rectifier into alternating current via a primary inverter; modifying a primary parameter at a component of a primary portion of the transmission system, so that as a consequence thereof, the electrical power consumed by a consumer is modified; contactlessly transmitting the electrical energy of the alternating current generated by the primary inverter from a primary coil to a secondary coil; converting the alternating current generated in the secondary coil into direct current via a secondary rectifier; modifying a secondary parameter at a component of a secondary portion of the transmission system, so that preferably as a consequence thereof, the electrical power consumed by a consumer is modified; feeding electrical energy as direct current to the consumer, wherein the primary rectifier, the primary inverter, and the primary coil form a primary portion of the transmission system, and the secondary coil and the secondary rectifier form a secondary portion of the transmission system, wherein a secondary parameter is modified in such a way that, after modifying the secondary parameter, the efficiency is greater than before the modification of the secondary parameter, and preferably, this iteration step is carried out multiple times and/or an A-efficiency of the contactless transmission of energy is determined with respect to a secondary A-parameter; subsequently, the secondary parameter is modified from the secondary A-parameter to at least one secondary B-parameter, and a B-efficiency is determined in each case with respect to the at least one secondary B-parameter, and from the A-efficiency and from the at least one B-efficiency, the one having the maximum efficiency is selected, and this selected maximum efficiency is referred to as the C-efficiency, and subsequently, the contactless transmission of energy using a secondary C-parameter which is associated with the C-efficiency is carried out as an iteration step for determining the secondary C-parameter. The secondary parameter with respect an efficiency is the secondary parameter during the occurrence of this efficiency, and preferably, no modification occurs during the ascertainment at the transmission system. The efficiency with respect to a secondary parameter is the efficiency during the occurrence of this secondary parameter, and preferably, no modification occurs during the ascertainment at the transmission system. A non-minimal efficiency is preferably considered as a selected maximum efficiency. In the case, for example, of three different efficiencies, the second- or third-greatest efficiency, but not the lowest efficiency, is selected as a maximum efficiency. Preferably, the maximum efficiency with respect to all efficiencies may also be selected as a selected maximum efficiency, so that, for example, in the case of three different efficiencies, the third-greatest efficiency, but not the second-greatest and lowest efficiency, is selected as a maximum efficiency.

In a supplemental embodiment, an A-efficiency of the contactless transmission of energy is determined with respect to a secondary A-parameter; subsequently, the secondary parameter is modified from the secondary A-parameter to at least two secondary B-parameters, and at least one secondary B-parameter is less than the secondary A-parameter in each case, and at least one secondary B-parameter is greater than the secondary A-parameter in each case, and with respect to the at least two secondary B-parameters, one B-efficiency is determined in each case, and from the A-efficiency and from the at least two B-efficiencies, the one having the maximum efficiency is selected, and this selected maximum efficiency is referred to as a C-efficiency, and subsequently, the contactless transmission of energy using a secondary C-parameter which is associated with the C-efficiency is carried out as an iteration step for determining the secondary C-parameter.

In an additional embodiment, in an additional iteration step, the required method steps of the iteration step are carried out again, in that the secondary C-parameter from the preceding iteration step is used for the secondary A-parameter.

In an additional variant, in at least one additional iteration step, the required method steps of the iteration step are carried out multiple times, until the difference between the C-efficiency of the preceding iteration step and the C-efficiency of the current iteration step is less than a threshold value.

Advantageously, a setpoint electrical input power to be consumed by the consumer is specified, and a difference between the actual electrical input power consumed by the consumer and the setpoint electrical input power to be consumed by the consumer is determined, and after each iteration step at the primary portion, the primary parameter is modified, so the magnitude of the difference between the actual electrical input power consumed by the consumer and the setpoint electrical input power to be consumed by the consumer is reduced, and/or the method is carried out via a transmission system described in this patent application, and/or during the execution of the iteration step for determining the secondary C-parameter, the primary parameter is held constant, in particular the primary parameter has a modification of less than 30%, 20%, 10%, 5%, or 2%.

In an additional embodiment, the primary parameter is modified, so that the magnitude of the difference between the actual electrical input power consumed by the consumer and the setpoint electrical input power to be consumed by the consumer becomes essentially equal to zero, in particular the magnitude of the ratio of the actual electrical input power and the setpoint electrical input power becomes less than 20%, 10%, 5%, 3%, or 1%.

In a supplemental embodiment, the primary parameter is modified by modifying the voltage at an output of a primary impedance transformer by means of the primary impedance transformer, or by modifying the pulse pattern modulation of the control signals of the primary inverter. In the case of the primary impedance transformer, the voltage at the input of the primary impedance transformer is equal to the product of a variable primary transformation factor and the voltage at the output of the primary impedance transformer, so that the variable primary transformation factor is the primary parameter.

In an additional embodiment, the secondary parameter is modified by modifying the voltage at an input of a secondary impedance transformer by means of the secondary impedance transformer, or by modifying the pulse pattern modulation of the control signals of the secondary rectifier. In the case of the secondary impedance transformer, the voltage at the input of the secondary impedance transformer is equal to the product of a variable secondary transformation factor and the voltage at the output of the secondary impedance transformer, so that the variable secondary transformation factor is the secondary parameter. In this case, pulse pattern modulation is to be understood to mean that the inverter and/or the rectifier are controlled in such a way that the transmission system is controlled using positive and negative pulse-like signals, for example, square-wave signals. The pulse pattern modulation involves controlling the frequency, number, or sequence of these pulse-like signals. In the case of the inverter, this may mean that the transmission system is controlled via a square-wave signal at a base frequency having omitted half waves or full waves, instead of via a single-frequency square-wave signal. In the case of the rectifier, this means that not all half waves or full waves of the current signal transmitted by the transmission means are rectified and thus routed to the consumer; but rather, some half waves or full waves are omitted via a controlled short circuit at the input of the rectifier, and recirculate in the secondary oscillating circuit of the transmission means.

The present invention furthermore comprises a computer program comprising programming code means which are stored on a computer-readable data carrier, in order to carry out a method described in this patent application, if the computer program is executed on a computer or a corresponding computing unit, or a control- and/or regulating unit.

An essential element of the present invention is also a computer program product comprising programming code means which are stored on a computer-readable data carrier, in order to carry out a method described in this patent application, if the computer program is executed on a computer or a corresponding computing unit, or a control- and/or regulating unit.

A vehicle arrangement according to the present invention, comprising a motor vehicle, a transmission system for contactlessly transmitting energy to a consumer, comprising a primary portion and a secondary portion, wherein the primary portion is arranged at least partially, in particular completely, outside the motor vehicle, and the secondary portion is at least partially, in particularly completely, integrated into the motor vehicle, wherein the transmission system is configured as a transmission system described in this patent application, and/or the control unit and/or regulating unit is integrated into the motor vehicle.

BRIEF DESCRIPTION OF THE DRAWINGS

An exemplary embodiment of the present invention will be described in detail below, with reference to the appended drawings. The following are shown.

DETAILED DESCRIPTION

Figure 1:
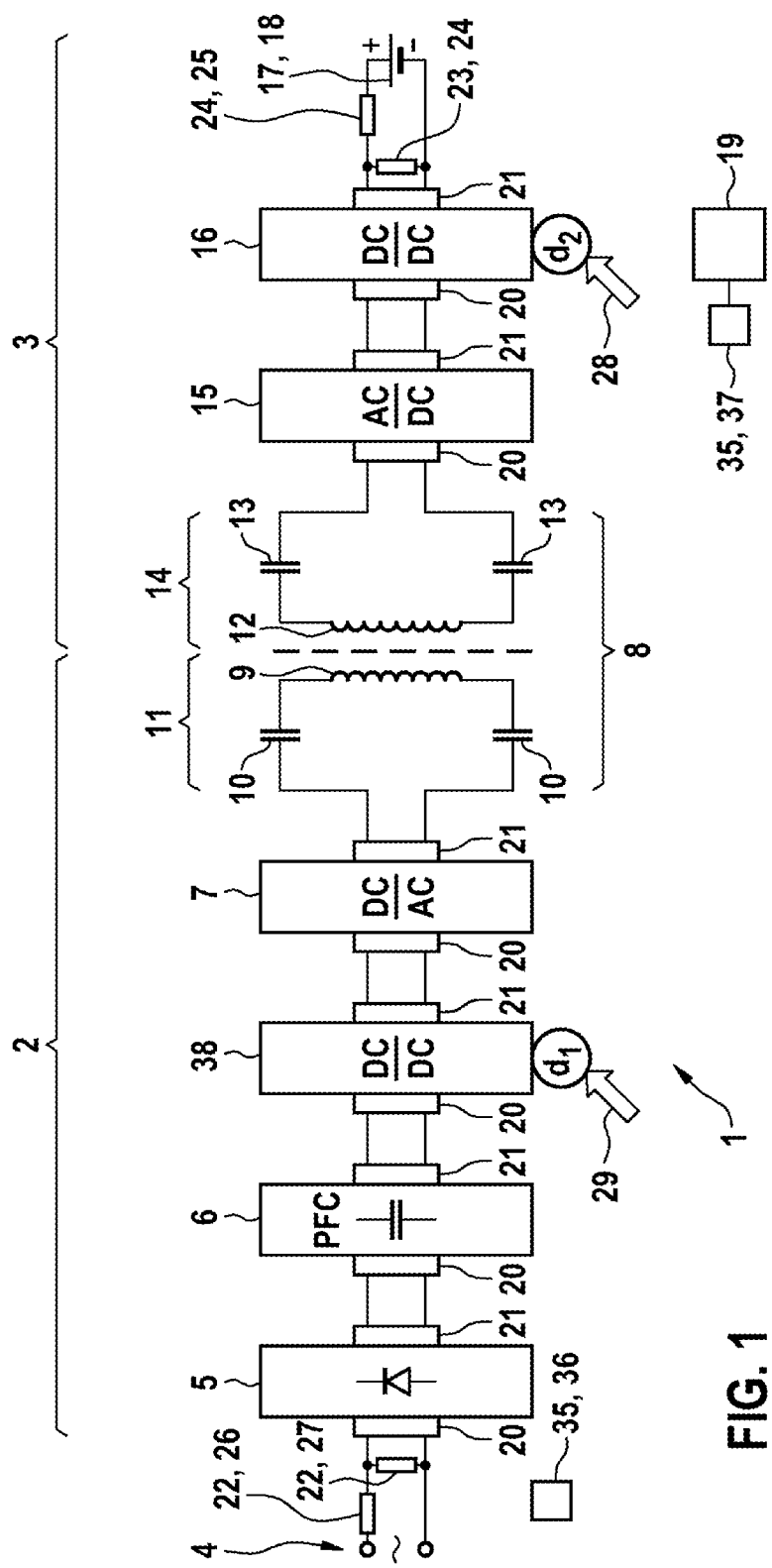
FIG. 1 shows a block diagram of a transmission system according to the present invention.
Figure 2:
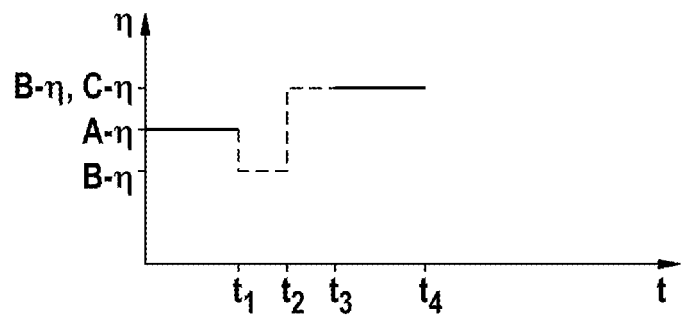
FIG. 2 shows a diagram of the efficiency η as a function of time t.

FIG. 1 shows a block diagram of a transmission system 1 according to the present invention. An alternating current source 4 of a power grid of a power supply company acts as an energy source, having a voltage of 220 V at a frequency of 50 Hz. An input 20 of a primary rectifier 5 in the form of a bridge rectifier 5 is electrically connected to the alternating current source 4 via two electrical conductors. The input 20 and an output 21 of the components of the transmission systems 1 are depicted in a uniform manner for all components. The primary rectifier 5 converts the alternating current at the input 20 into a pulsed direct current at the output 21 of the primary rectifier 5. The primary rectifier 5 is not an uncontrolled half-wave rectifier; thus, all half-waves are rectified. Thus, a pulsed direct current having a frequency of 100 Hz results at the output 21 of the primary rectifier 5.

The pulsed direct current provided by the primary rectifier 5 is fed to a power correction filter 6 as PFC (power factor correction), comprising an additional capacitor for smoothing the direct current generated by the primary rectifier 5. Thus, an essentially constant voltage U results at the input 20 of a primary impedance transformer 38, or rather, DC/DC converter 38. The direct current, or rather, electricity, provided at the output 21 of the primary impedance transformer 38, is converted in the primary inverter 7, or rather, DC/AC converter 7, into alternating current having a high frequency of, for example, 120 kHz, which is available at the output 21 of the inverter 7 and which is introduced into a primary oscillating electric circuit 11 comprising a primary coil 9 and two primary capacitors 10. Due to the high frequency of the alternating current generated by the inverter 7, the primary coil 9 generates a high-frequency alternating magnetic field which induces a high-frequency alternating current in a secondary coil 12. The primary and secondary oscillating electric circuits 11, 14 have a common resonant frequency. The primary inverter 7 is preferably switched in such a way that the switching instants take place at instants with little or no current in the primary oscillating electric circuit 11 (zero current switching, ZCS), so that only minor switching losses occur in the semiconductor elements of the primary inverter 7. The power which is contactlessly transmittable from the primary coil 9 to the secondary coil 12 is a linear function of the frequency of the alternating current generated by the inverter 7, so that a high-frequency alternating magnetic field makes sense for contactlessly transmitting sufficient electrical power; however, higher frequencies also result in higher losses during transmission, and in addition, there are legal limit values for the frequency of the generated alternating magnetic field.

The secondary coil 12 is an integral component of the secondary oscillating circuit 14 comprising a secondary coil 12 and two secondary capacitors 13. The high-frequency alternating current induced in the secondary oscillating circuit 14 is converted into direct current in a secondary rectifier 15, or rather, secondary AC/DC converter 15. A secondary impedance transformer 16, or rather, secondary DC/DC converter 16, modifies the voltage between the input 20 and output 21 of the secondary impedance transformer 16 as a step-up converter 16 if the voltage is increased, or as a step-down converter 16 if the voltage is reduced. The output 21 of the secondary impedance transformer 16 is electrically connected to a consumer 17 in the form of a battery 18. The primary oscillating circuit 11 and the secondary oscillating circuit 14 form a transmission means 8.

The primary rectifier 5, the power correction filter 6, the primary inverter 7, the primary impedance transformer 38, and the primary oscillating circuit 11 form a primary portion 2 of the transmission system 1. The secondary oscillating circuit 14, the secondary rectifier 15, the secondary impedance transformer 16, and the consumer 17 form a secondary portion 3 of the transmission system 1.

The voltage U at the secondary portion 3, i.e., the voltage present at the output 21 of the secondary impedance transformer 16, is detected via a sensor 23. The current I at the secondary portion 3, i.e., the current I flowing at the output 21 of the secondary impedance transformer 16, is quantitatively detected via a sensor 25. For charging the battery 18, a certain charging current power $P_L$ is specified as a controlled variable, in order, for example, to be able to fully charge the battery 18 within a specified period. The voltage U detected by the sensor 23 and the current I detected by the sensor 25 are transmitted via data lines, which are not depicted, to a control and/or regulating unit 19, and detection of a secondary electrical power $P_S$ as the electric charging current power $P_L$ from the detected voltage U and the detected current I, i.e., $P_S=P_L$ is carried out by means of control and/or regulating unit 19. The sensors 23, 25 thus form a secondary power detection means 24.

The voltage U at the primary portion 2, i.e., the voltage present at the input 20 of the primary rectifier 5, is detected via a sensor 27. The current I at the primary portion 2, i.e., the current I flowing at the input 20 of the primary rectifier 5, is quantitatively detected via a sensor 26. The voltage U which is detected by the sensor 23 and the current I which is quantitatively detected by the sensor 25 are transmitted via data lines, which are not depicted, to a device 35 for wirelessly transmitting data. The device 35 comprises a transmitter 36 and a receiver 37. The receiver 37 is connected via data lines to the control and/or regulating unit 19. From the data which is transmitted to the control and/or regulating unit 19, detection of a primary electrical power $P_P$ from the detected voltage U and the detected current I at the input 20 of the primary rectifier 5 is carried out by means of the control and/or regulating unit 19. The sensors 26, 27 thus form a primary power detection means 22.

The efficiency η of the transmission system is calculated by the control and/or regulating unit 19 from the primary electrical power $P_P$ and the secondary electrical power $P_S$, using the following formula:

$$\eta = P_S/P_P$$

The regulation of the secondary electrical power $P_S$ as the electrical charging current power $P_L$ takes place via the primary impedance transformer 38, in that a modification 29 of the voltage U and the current I at the output 21 of the primary impedance transformer 38 is carried out, for example, the setpoint charging current power $P_L=3$ kW. The voltage U at the input 20 of the primary impedance transformer 38 is equal to the product of a variable primary transformation factor and the voltage U at the output 21 of the primary impedance transformer 38. The primary transformation factor is thus a primary parameter.

The voltage U at the input 20 of the secondary impedance transformer 16 is equal to the product of a variable secondary transformation factor and the voltage U at the output 21 of the secondary impedance transformer 16. The secondary transformation factor is thus a secondary parameter. The modification 28 of the voltage U at the input 20 of the secondary impedance transformer 16, or rather, the modification of the secondary transformation factor, is therefore a modification 28 of a secondary parameter $d_2$. The modification of the voltage U at the input 20 of the secondary impedance transformer 16 causes a modification of the current I at the input 20 of the secondary impedance transformer 16, if the electrical power is essentially held constant.

To optimize and maximize the efficiency of the transmission system 1, while a secondary A-parameter $d_2$, or rather, secondary starting parameter $d_2$, is constant, an associated A-efficiency (A-η), or rather, starting efficiency (A-η), is calculated up to time $t_1$ by the control and/or regulating unit 19. Subsequently, the secondary parameter $d_2$ is modified with respect to one or a plurality of secondary B-parameters $d_2$, or rather, subsequent parameters $d_2$, which are greater than the secondary A-parameter $d_2$, and with respect to one or a plurality of secondary B-parameters $d_2$ which are less than the secondary A-parameter $d_2$.

Figure 3:
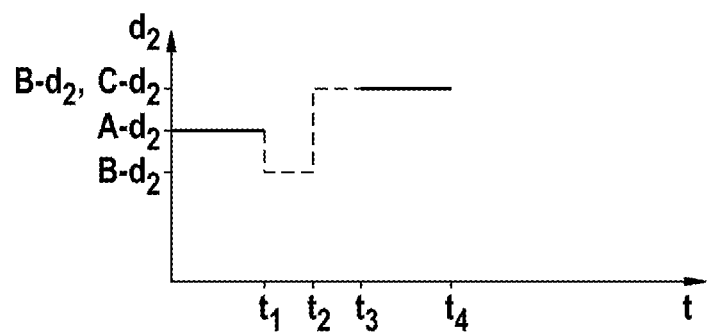
FIG. 3 shows a diagram of the secondary parameter $d_2$ as a function of time t.
Figure 4:
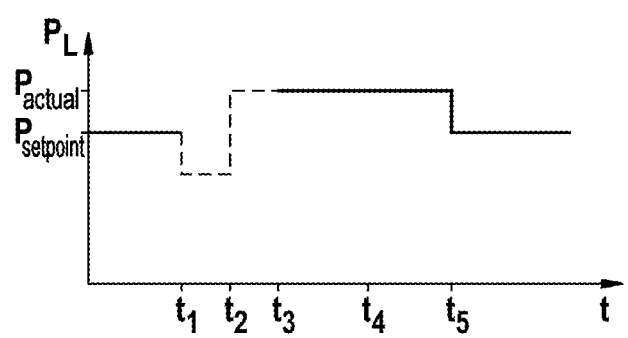
FIG. 4 shows a diagram of the charging power $P_L$ as a function of time t.
Figure 5:
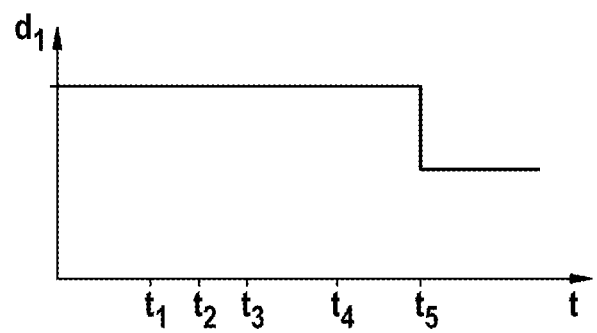
FIG. 5 shows a diagram of the primary parameter $d_1$ as a function of time t.

This is depicted in FIG. 3 by way of example for two modifications of the secondary parameter $d_2$. In FIG. 3, at time $t_1$, the secondary parameter $d_2$ is modified to a secondary B-parameter $d_2$ which is less than the secondary A-parameter $d_2$ and which is held constant up to time $t_2$. At time $t_2$, the secondary parameter $d_2$ is modified to a secondary B-parameter $d_2$ which is greater than the secondary A-parameter $d_2$ and which is held constant up to time $t_3$. Modifying the secondary parameter $d_2$ also causes a modification of the charging power $P_L$.

The B-efficiencies (B-η) which are associated with the secondary B-parameters $d_2$ are ascertained in that the efficiency is calculated as the B-efficiency (B-η) while a secondary B-parameter $d_2$ is constant for a short time. The secondary B-parameters $d_2$ having the respectively associated B-efficiencies (B-η), as well as the secondary A-parameter $d_2$ having the associated A-efficiency (A-η), are stored in a data storage device of the control and/or regulating unit 19. According to FIGS. 2 to 5, at time $t_4$, the efficiency having the highest value, i.e., the maximum efficiency, is selected from the A-efficiency (A-η) and the B-efficiencies (B-η). The maximum A- or B-efficiency (A-η, B-η) is referred to as the C-efficiency (C-η), or rather, selection efficiency (C-η), and the secondary parameter $d_2$ which is associated with the C-efficiency (C-η) is the secondary C-parameter $d_2$ and which is stored in the data memory. The above method steps are carried out while the primary parameter $d_1$ is constant, because either the control and/or regulation of the primary parameter $d_1$ is temporally matched to the control and/or regulation, or rather, modification, of the secondary parameter $d_2$, or the control and/or regulation of the primary parameter $d_1$ is carried out temporally more slowly than the control and/or regulation, or rather modification, of the secondary parameter $d_2$. The primary and secondary impedance transformers 16, 38 may be controlled and/or regulated either by the control and/or regulating unit 19, or the primary impedance transformer 38 is controlled and/or regulated by another computing unit (not depicted), and the secondary impedance transformer 16 is controlled and/or regulated by the control and/or regulating unit 19. Subsequently, the transmission system 1 is operated as of time $t_4$ using the secondary C-parameter $d_2$, so that the transmission system 1 is operated at a higher efficiency.

The above-described iteration step for determining the C-parameter $d_2$ may be repeated any number of times, in that the C-parameter $d_2$ from the preceding iteration step is used for the secondary A-parameter $d_2$.

Due to the increase in the efficiency of the transmission system 1 via the above-described iteration steps, as of time $t_3$, the transmission system 1 is operated at a higher actual charging power $P_{actual}$ (FIG. 4), which is greater than the desired setpoint charging power $P_{setpoint}$. For this reason, regulation of the charging power $P_L$ is necessary with a modification of the primary parameter $d_1$ as of time $t_5$, so as of time $t_5$, the charging power $P_L$ again corresponds to the setpoint charging power $P_{setpoint}$. Subsequently, the iteration steps may optionally be carried out again.

In an additional exemplary embodiment which is not depicted, the transmission system 1 does not comprise a primary impedance transformer 38 and or a secondary impedance transformer 15. The modification of a primary parameter $d_1$ for modifying the electrical power consumed by the consumer 17 is a modification of the pulse pattern modulation of the control signals of the primary inverter 7 as a component 7 of the primary portion 2 of the transmission system 1. The modification 28 of a secondary parameter $d_2$ for modifying the electrical power consumed by the consumer 17, or rather for optimizing the efficiency to a maximum efficiency, is a modification 28 of the pulse pattern modulation of the control signals of the secondary rectifier 15 as a component 15 of the secondary portion 3 of the transmission system 1. This modification of the primary and secondary parameters $d_1$, $d_2$ is described in DE 10 2014 207 854, and the disclosure of that patent application is incorporated into this patent application.

Figure 6:
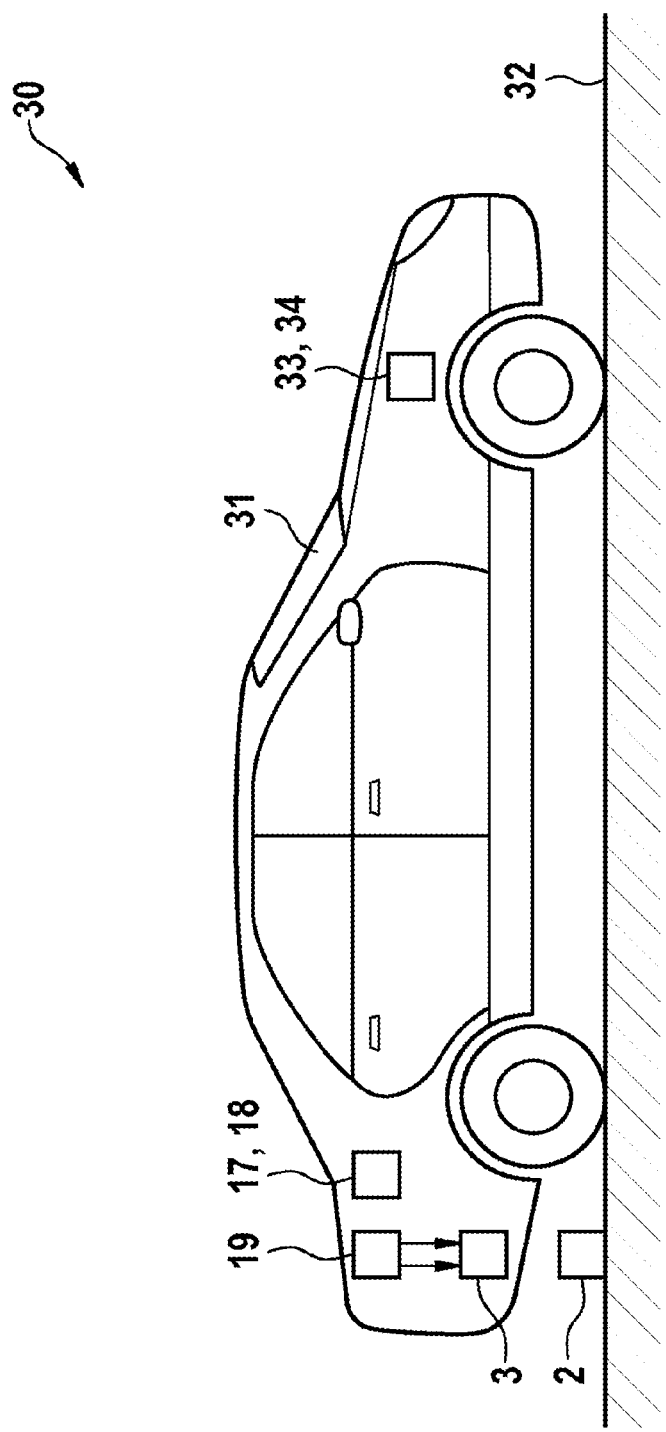
FIG. 6 shows a side view of a vehicle arrangement comprising a motor vehicle.

A vehicle arrangement 30 depicted in FIG. 6 shows a motor vehicle 31 having a drive motor 33 in the form of an electric motor 34. The motor vehicle 31 comprises a battery 18, and the battery 18 supplies the electric motor 34 in the form of a drive motor 33 for driving the motor vehicle 31. The primary portion 2 of the transmission system 1 is integrated into the ground 32, and the secondary portion 3 is integrated into the motor vehicle 31. The charging of the battery 18 may then be carried out contactlessly while parking the motor vehicle 31.

On the whole, the transmission system 1 according to the present invention and the method for contactlessly transmitting energy to a consumer 17, as well as the vehicle arrangement 30 according to the present invention, have significant advantages. An optimal and maximum efficiency of the transmission system 1 is iteratively determined by modifying 28 the secondary parameter $d_2$. This is in particular advantageous if the primary portion 2 and the secondary portion 3 are from different manufacturers and are combined to form the transmission system 1, so that a customized maximization of the efficiency of the transmission system 1 may be carried out.

The invention claimed is:

1. A transmission system (1) for contactlessly transmitting electrical energy to a consumer (17), comprising
  a primary portion (2) including
    a primary rectifier (5) for converting alternating current from an alternating current source (4) into direct current,
    a primary inverter (7) for generating alternating current from the direct current generated by the primary rectifier (5), and
    a primary DC/DC impedance transformer (38);
  a transmission means (8) for contactlessly transmitting electrical energy of the alternating current from the primary inverter (7) via a direct connection with a first capacitor directly connected to an input side of a primary coil and an output side of the primary coil is directly connected to a second capacitor to form a primary oscillating electric circuit, and a second connection with a third capacitor that is directly connected to an input side of a secondary coil and an output side of the secondary coil is directly connected to a fourth capacitor to form a secondary oscillating electric circuit, and
  a secondary portion (3) including
    a secondary rectifier (15) for converting alternating current from the secondary coil (12) into direct current and a secondary DC/DC impedance transformer (16) configured to feed electrical energy as direct current to a consumer (17);
  and
  a controller (19) configured to control
    modification of a primary parameter ($d_1$) of the primary DC/DC impedance transformer (38), modifying the voltage at an output (21) of the primary impedance transformer (38), such that the electrical power consumed by the consumer (17) is modified,
    modification of a secondary parameter ($d_2$) of the secondary DC/DC impedance transformer (16), to modify the voltage output (21) of the secondary DC/DC impedance transformer (16),
    determination of an A-efficiency of the contactless transmission of energy with respect to a first A-parameter (A-$d_2$) that the secondary parameter ($d_2$) of the secondary DC/DC impedance transformer (38) is modified to,
    modification of the secondary parameter ($d_2$) from the first A-parameter (A-$d_2$) to at least one B-parameter (B-$d_2$), wherein the at least one B-parameter (B-$d_2$) is greater than the A-parameter (A-$d_2$),
    determination of a B-efficiency for each case that the secondary parameter ($d_2$) is modified to the at least one B-parameter (B-$d_2$), and
    determination of a maximum efficiency from the determined at least one B-efficiency and A-efficiency, designated as a C-efficiency,
    wherein the contactless transmission of energy is carried out using the parameter (A-$d_2$ or B-$d_2$) corresponding to the C-efficiency, designated as a C-parameter (C-$d_2$), as an iteration step for determining the C-parameter (C-$d_2$).

2. The transmission system as claimed in claim 1, wherein the transmission system (1) comprises a primary power detector (22) for detecting primary electrical power at the primary portion (2) at an input (20) of the primary rectifier (5).

3. The transmission system as claimed in claim 1, wherein the transmission system (1) comprises a secondary power detector (24) for detecting secondary electrical power at the secondary portion (3) at an input of a consumer (17).

4. The transmission system as claimed in claim 3, wherein an efficiency of the transmission systems (1) is ascertainable via the controller (19), by dividing the secondary electrical power by the primary electrical power.

5. The transmission system as claimed in claim 1,
  wherein
  the controller (19) is integrated into the secondary portion (3) of the transmission system (1), and
  the transmission system further includes a transmitter (35) for wirelessly transmitting data related to primary electrical power at the primary portion (2), from the primary portion (2) to the secondary portion (3) of the transmission system (1), and vice-versa.

6. A method for contactlessly transmitting electrical energy to a consumer (17) via a transmission system (1), the method comprising:

converting alternating current from an alternating current source (4) into direct current via a primary rectifier (5), converting the direct current generated by the primary rectifier (5) into alternating current via a primary inverter (7), modifying a primary parameter ($d_1$) at a primary impedence transformer (38) of a primary portion (2) of the transmission system, modifying the voltage output (21) of the primary impedance transformer (38), such that the electrical power consumed by a consumer (17) is modified, contactlessly transmitting electrical energy of the alternating current generated by the primary inverter (7) via a direct connection with a first capacitor directly connected to an input side of a primary coil and an output side of the primary coil is directly connected to a second capacitor to form a primary oscillating electric circuit, and a second connection with a third capacitor that is directly connected to an input side of a secondary coil and an output side of the secondary coil is directly connected to a fourth capacitor to form a secondary oscillating electric circuit, and converting the alternating current generated in the secondary coil (12) into direct current via a secondary rectifier (15), modifying a secondary parameter ($d_2$) at a secondary impedance transformer (16) of a secondary portion (3) of the transmission system (1), feeding electrical energy as direct current to the consumer (17), modifying the voltage output (21) of the secondary impedance transformer (16), wherein the primary rectifier (5), the primary inverter (7), and the primary coil (9) form a primary portion (2) of the transmission system (1), and the secondary coil (12) and the secondary rectifier (15) form a secondary portion (3) of the transmission system (1), determining an A-efficiency of the contactless transmission of energy with respect to a first A-parameter (A-$d_2$) that the secondary parameter ($d_2$) of the secondary DC/DC impedance transformer (38) is modified to, modifying the secondary parameter ($d_2$) from the A-parameter (A-$d_2$) to at least one B-parameter (B-$d_2$)), wherein the at least one B-parameter (B-$d_2$) is greater than the A-parameter (A-$d_2$), determining a B-efficiency for each case that the secondary parameter ($d_2$) is modified to the at least one B-parameter (B-$d_2$), and selecting a maximum efficiency from the determined at least one B-efficiency and A-efficiency, designated as a C-efficiency, wherein the contactless transmission of energy is carried out using the parameter (A-$d_2$ or B-$d_2$) corresponding to the C-efficiency, designated as a C-parameter (C-$d_2$), as an iteration step for determining the C-parameter (C-$d_2$).

7. The method as claimed in claim 6, wherein the secondary parameter is modified from the A-parameter (A-$d_2$) to at least two B-parameters (B-$d_2$), and the second of the at least two B-parameters (B-$d_2$) is less than the A-parameter (A-$d_2$).

8. The method as claimed in claim 6, wherein in an additional iteration step, the required method steps of the iteration step are carried out again, in that the C-parameter (C-$d_2$) from the preceding iteration step is used for a second initial A-parameter (A-$d_2$).

9. The method as claimed in claim 6, wherein in at least one additional iteration step, the required method steps of the iteration step are carried out a plurality of times, until the difference between the C-efficiency of the preceding iteration step and the C-efficiency of the current iteration step is less than a threshold value.

10. The method as claimed in claim 6, the method further comprising specifying a setpoint electrical input power to be consumed by the consumer (17), determining a difference between an actual electrical input power consumed by the consumer (17) and the setpoint electrical input power to be consumed by the consumer (17), and modifying, after each iteration step at the primary portion (2), the primary parameter ($d_1$), so that a magnitude of the difference between the actual electrical input power consumed by the consumer (17) and the setpoint electrical input power to be consumed by the consumer is reduced.

11. The method as claimed in claim 10, wherein the primary parameter ($d_1$) is modified, so that the magnitude of the difference between the actual electrical input power consumed by the consumer (17) and the setpoint electrical input power to be consumed by the consumer (17) is approximately zero.

12. The method as claimed in claim 9, wherein the primary parameter ($d_1$) is further modified by modifying the pulse pattern modulation of the control signals of the primary inverter (7).

13. The method as claimed in claim 9, wherein the secondary parameter ($d_2$) is further modified by modifying the pulse pattern modulation of the control signals of the secondary rectifier (15).

14. A vehicle arrangement (30), comprising
a motor vehicle (31),
a transmission system (1) for contactlessly transmitting energy to a consumer (17), comprising a primary portion (2) and a secondary portion (3),
wherein the primary portion (2) is arranged at least partially outside the motor vehicle (31), and the secondary portion (3) is at least partially, integrated into the motor vehicle (31),
wherein
the transmission system (1) is configured as claimed in claim 1.

15. The vehicle arrangement as claimed in claim 14, wherein a control and/or regulating unit (19) is integrated into the motor vehicle (31).

16. A vehicle arrangement (30), comprising
a motor vehicle (31),
a transmission system (1) for contactlessly transmitting energy to a consumer (17), comprising a primary portion (2) and a secondary portion (3),
wherein the primary portion (2) is arranged completely outside the motor vehicle (31), and the secondary portion (3) is completely integrated into the motor vehicle (31),
characterized in that
the transmission system (1) is configured as claimed in claim 1.

17. The method as claimed in claim 11, wherein the magnitude of the ratio of the actual electrical input power and the setpoint electrical input power becomes less than 20%.

18. The method as claimed in claim 10, wherein during the execution of the iteration step for determining the C-parameter (C-$d_2$), the primary parameter ($d_1$) is essentially held constant, in particular the primary parameter ($d_1$) has a modification of less than 30%, 20%, 10%, 5%, or 2%.

* * * * *